United States Patent [19]

Barbal

[11] 4,075,741
[45] Feb. 28, 1978

[54] AUTOMATICALLY DISENGAGABLE SAFETY BUCKLE

[76] Inventor: Andrew Barbal, 147-29 16th Road, Whitestone, N.Y. 11357

[21] Appl. No.: 738,071

[22] Filed: Nov. 2, 1976

[51] Int. Cl.² .............................................. A44B 11/00
[52] U.S. Cl. ............................... 24/201 TR; 24/230 R
[58] Field of Search ........... 24/236, 231, 75, DIG. 30, 24/201 R, 201 D, 201 TR, 201 BN, 201 S, 265 SH, 265 BH, 224 R, 224 HE, 224 SB, 222 SS, 222 SE, 230 R, 230 SL, 115 F

[56] References Cited

U.S. PATENT DOCUMENTS

| | | | |
|---|---|---|---|
| 2,814,336 | 11/1957 | Manhart et al. | 24/230 R |
| 3,238,587 | 3/1966 | Goinard | 24/201 D |

Primary Examiner—Paul R. Gilliam
Assistant Examiner—Kenneth J. Dorner
Attorney, Agent, or Firm—Robert D. Farkas

[57] ABSTRACT

An automatically disengagable safety buckle utilizes a C-shaped rod-like element secured to one end of a flexible safety strap. A plate having a hook-like end is secured to one end of another flexible safety strap. The C-shaped rod is introduced between a spring-like sheet secured to the plate and spaced non-uniformly outwardly therefrom on the side of the plate carrying the hook. The C-shaped rod is permitted to slide along the sheet, after entry, to a dwell position which is defined by an outwardly disposed arcuate excursion in the surface of the sheet. The apparatus is employed prior to impact with the rod-like element reposing in the dwell position. Upon impact, the C-shaped element is displaced towards the hook of the plate and is forced upwardly and outwardly therefrom by a hook-like end of a spring secured to the plate, causing the rod-like element to become disengaged from between the sheet and the plate, thus decoupling the rod-like element from the plate.

2 Claims, 12 Drawing Figures

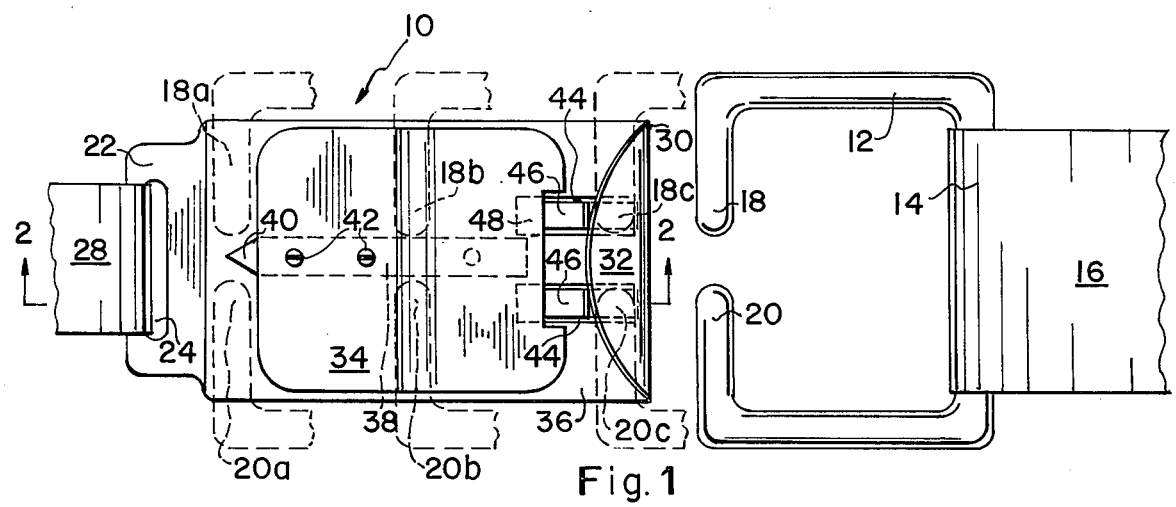
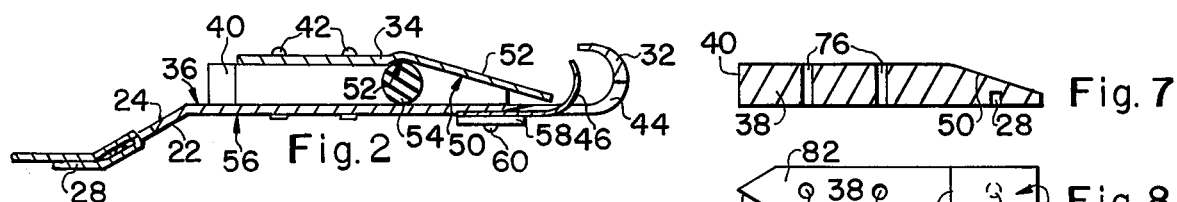
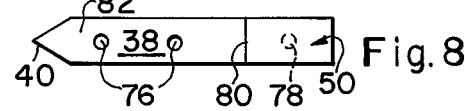
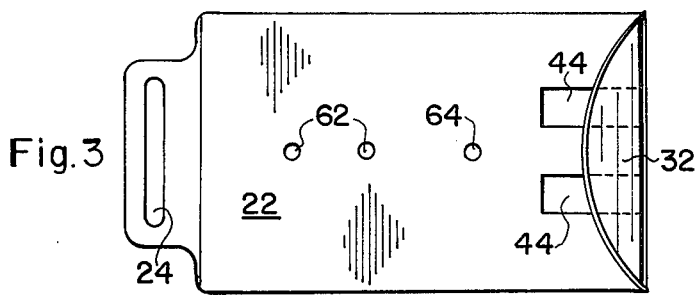
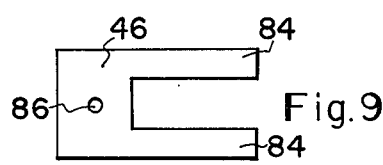
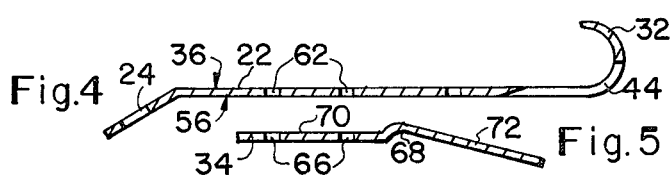
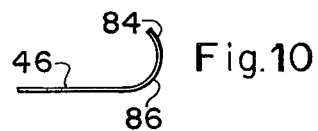
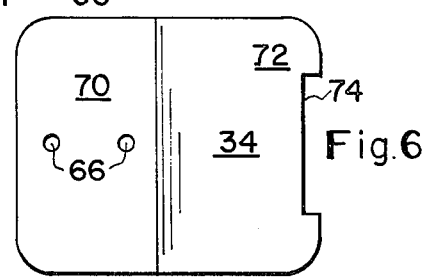
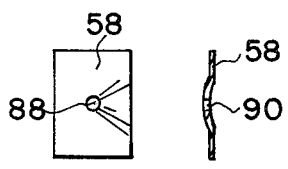

AUTOMATICALLY DISENGAGABLE SAFETY BUCKLE

BACKGROUND OF THE INVENTION

1. Field of the Invention

This invention relates to buckle assemblies and more particularly to that class which automatically disengages the ends of a pair of straps upon a sufficient tensional force being exerted thereupon.

2. Description of the Prior Art

The prior art abounds with safety buckle devices primarily intended for use in motor vehicles. U.S. Pat. No. 2,869,200 issued on Jan. 20, 1959 H. P. Peters et al and U.S. Pat. No. 3,676,901 issued on July 18, 1972 to R. J. Monti both teach quick release buckle arrangements for seatbelt devices installed in motor vehicles. Both employ a lever which when manually pivoted outwardly from the body of the apparatuses, causes the adjacent ends of the belts to become disengaged.

Both of the aforementioned patents suffer the common deficiency of requiring the user to manually disengage the belts after impact. This requirement tends to cause a number of safety belt users to avoid the use of the safety belt for fear of becoming trapped strapped within the vehicle after a collision.

SUMMARY OF THE INVENTION

A primary object of the present invention is to provide a safety buckle for use on seat belts in motor vehicles which securely captures the user within the confines of the belts during the occurence of a collision.

Another object is to provide a safety belt which automatically releases the user from an encircled condition after the occurrence of an impact.

Still another object is to provide a safety belt which may be manually operated into the open position upon the application of opposed forces to the ends of the belts to which the buckle elements are attached.

Yet another object is to provide a buckle arrangement for a seat belt whose elements may be quickly and easily joined together.

A further object is to provide a buckle arrangement in accordance with the preceeding objects, which is relatively inexpensive easy to manufacture and suitable for its particular purposes.

Heretofore, buckle attachments for seatbelts in motor vehicles required manually applied force to the buckle device in order to disengage the user from confinement within the belts. Many potential seat belt users refuse to wear seatbelts for fear of being trapped within a vehicle after the occurrence of an impact, the fear being heightened by the possibility of fire occuring following the impact. The user must apply a specifically directed motion to the buckle apparatus so as to release it, which may be difficult if not impossible to provide due to a physical disability of the user occasioned by the impact itself.

The present invention contemplates this problem and solves same by providing a buckle apparatus which maintains flexible straps in a secure joined position during impact, disengaging same automatically after the impact.

These objects, as well as other objects of the present invention, will become more readily apparent after reading the following description of the accompanying drawings.

BRIEF DESCRIPTION OF THE DRAWINGS

FIG. 1 is a plan view of the elements of the present invention;

FIG. 2 is a side elevation cross-sectional view taken along line 2—2 viewed in the direction of arrows 2—2 as shown in FIG. 1;

FIG. 3 is a plan view of the plate illustrated in FIG. 1;

FIG. 4 is a side elevation cross-sectional view of the plate shown in FIG. 3;

FIG. 5 is a side elevation cross-sectional view of the strap shown in FIG. 1.

FIG. 6 is a plan view of the strap shown in FIG. 5;

FIG. 7 is a side elevation cross-sectional view of the bar shown in FIG. 7;

FIG. 8 is a plan view of the bar shown in FIG. 7;

FIG. 9 is a plan view of the spring like member shown having informed hook-like ends;

FIG. 10 is a side elevational view of the spring element as shown in FIG. 9, having hook-like end;

FIG. 11 is a plan view of the spring element retaining plate shown in FIG. 1; and FIG. 12 is a side elevation cross-sectional view of the spring element retaining plate, as shown in FIG. 11.

DESCRIPTION OF THE PREFERRED EMBODIMENT

The structure and method of fabrication of the present invention is applicable to a C-shaped rod-like element pivotably secured to one end of a first strap of a seatbelt apparatus installed in a motor vehicle. The free ends of the rod-like element are disposed directed towards each other and are separated by a fixed distance. A plate-like element is provided having a hook-like surface formed at one end thereof. The other end of the plate is adapted with an extended slot to which an end of a second seatbelt strap is secured. A bar is fastened to the surface of the plate and extends centrally between the hook-like end and the slotted end thereof. The bar is pointed closest to the slotted end of the plate and has a ramped exterior surface adjacent the other end of the bar directed inwardly towards the surface of the plate carrying the concave portion of the hook end of the plate. The plate is provided with a pair of slots extending parallel to each other and parallel to the longitudinal axis of the bar each being located on opposite sides of the bar adjacent the concave portion of the hook. A spring element retaining plate is utilized to sandwich a spring steel spring element to the lateral surface of the plate co-extensive with the convex portion of the hook end thereof. The spring element is provided with a pair of hook-like ends passing through the slots and lying intermediate the concave portion of the hook and the bar. A spring-like steel sheet has a first portion thereof secured to a portion of the bar adjacent the end of the plate carrying the slot. A portion adjacent the other end of the sheet resides in touching engagement with the ramped portion of the bar. The mid portion of the sheet is adapted with an arcuately shaped notch extending outwardly from the lateral surface of the plate co-extensive with the concave surface of the hook. The width of the bar is slightly smaller than the distance separating the free ends of the rod-like element. The unramped portion of the bar is adapted to have a height equivalent to the thickness of the rod-like element adjacent the free ends thereof.

In use, the rod-like C-shaped element is disposed touching the plate intermediate the slot therein and the pointed end of the bar. The rod-like element is then disposed sliding along the surface of the plate so as to have the rod-like free ends of the C-shaped element captured between adjacent faces of the sheet and the plate. When the rod-like free end of the C-shaped element are disposed at a location beneath that portion of the sheet containing the arcuate excursion, the rod-like element is securely but temporarily retained between the sheet and the plate. Upon the occurrence of an impact, the rod-like element is forced to travel towards the hook end of the plate, lifting the inwardly directed free portion of the sheet upwardly and outwardly from its rest position. When sufficient force is applied, the free ends of the rod-like element come into touching engagement with the concave surface of the hook end of the plate, remaining nestled therein until such time that the impact forces cease to exist. The hook-like end of the spring element then forces the free ends of the rod-like element in a direction towards the slotted end of the plate so as to ride up on the uppermost outer surface of the ramp portion of the sheet. When in this position, the rod-like element is disengaged from the plate, freeing the user automatically from confinement between the straps.

Now referring to the Figures, and more particularly to the embodiment illustrated in FIG. 1 showing the present invention 10 having a C-shaped rod-like element 12 pivotably secured to end 14 of seat belt strap 16. Free ends 18 and 20 of rod-like element 12 are directed towards each other and separated a finite distance apart. Plate 22 is provided with a slot 24 pivotally engaging end 26 of seat belt strap 28. End 30 of plate 22 is provided with a hook 32. Sheet 34 is shown disposed mounted upon lateral surface 36 of plate 22. Surface 36 is co-extensive with the concave surface comprising hook 32. Bar 38 is disposed intermediate surface 36 and sheet 34 and is provided with a pointed end 40. Bolts 42 pass through sheet 34 and bar 38 and plate 22. Openings 44 are shown located in surface 36 permitting the hook-like ends 46 of spring element 48 to pass therethrough. Dotted lines 18a and 20a depict the location of the free ends of C-shaped element 12 preparatory to being captured between sheet 34 and plate 22. Dotted lines 18b and 20b illustrate the location of the free ends of C-shaped element 12 when captured between sheet 34 and plate 22 in a normal use position. Dotted lines 18c and 20c illustrate the location of the free ends of C-shaped element 12 when nested within hook 32 as in an impact location.

FIG. 2 shows plate 22 having bar 38 secured on surface 36 thereof. Sheet 34 is shown bolted to bar 38 and plate 22 by way of bolts 42. Bar 38 is shown having a ramped exterior surface 50 upon which portion 52 of sheet 34 resides in touching engagement therewith. Arcuate excursion 52 of sheet 34 is shown capturing a portion 54 of rod-like element 12, as shown in FIG. 1, adjacent free end 20 as depicted by dotted lines 20b. Spring element 46 is shown passing through opening 44 and is captured to lateral surface 56 of plate 22 utilizing spring element retaining plate 58 and bolt 60 therefor. Lateral surface 56 is shown co-extensive with the convex surface of hook 32.

FIG. 3 illustrates plate 22 having hook 32 formed at one end thereof and slot 24 being disposed located at the other end thereof. Openings 44 are located adjacent hook 32. Holes 62 are utilized to retain bolts 42, as shown in FIG. 1. Hole 64 is utilized to retain bolt 60, as shown in FIG. 2.

FIG. 4 shows lateral surfaces 36 and 56 co-extensive with the concave and convex surfaces forming hook 32. Slot 24 is shown carried in a portion of plate 22, which is preferably bent at approximately 20° from the lateral surfaces forming the major surfaces of plate 22 so as to conform to the frontal shape of the body at the waistline.

FIG. 5 illustrates sheet 34 having holes 66 therein. Holes 66 are utilized to mount sheet 34 to bar 38 by way of bolts 42, shown in FIG. 2. Arcuately shaped portion 68 of sheet 34 delineates the straight portion 70 thereof from the annularly displaced portion 72 thereof.

FIG. 6 shows sheet 34 being provided with notch 74 utilized to accommodate spring element 46 therein.

FIG. 7 illustrates bar 38 which is shaped like the prow of a boat and has a wedge-shaped end 40 and ramped surface 50. Holes 76 accommodate bolts 42, shown in FIG. 1, and blind hole 78 accommodates the free end of bolt 60, shown in FIG. 2.

FIG. 8 shows bar 38 and line 80 delineating ramped surface 50 from flat surface portion 82 thereof.

FIG. 9 illustrates spring element 46 having a pair of tine-like ends 84. Hole 86 is utilized to accommodate bolt 60, shown in FIG. 2.

FIG. 10 shows spring element 46 having tine-like ends 84 formed into a hook like end 86.

FIG. 11 illustrates spring element retaining plate 58 adapted with hole 88 therein. Bolt 60, shown in FIG. 2, passes through hole 88 causing plate 58 to clampingly engage spring element 46 to surface 56, as shown in FIG. 2.

FIG. 12 shows spring element retaining plate 58 having a deformation 90 in the lateral surfaces thereof, permitting tine-like ends 84 of spring element 46 as shown in FIG. 9 to move independently of one another when free ends 18 and 20 of C-shaped element 12, as shown in FIG. 1, is nested within the concave surface of hook 32.

One of the advantages of the present invention is to provide a safety buckle for use on seat belts in motor vehicles which securely captures the user within the confines of the belts during the occurrence of a collision.

Another advantage is to provide a safetybelt which automatically releases the user from an encircled condition after the occurrence of an impact.

Still another advantage is to provide a safety belt which may be manually operated into the open position upon the application of opposed forces to the ends of the belts to which the buckle elements are attached.

Yet another advantage is to provide a buckle arrangement for a seat belt whose elements may be quickly and easily joined together.

A further advantage is to provide a buckle arrangement in accordance with the preceeding advantages, which is relatively inexpensive, easy to manufacture and suitable for its particular purposes.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows, I claim:

1. An automatically disengagable safety buckle comprising a C-shaped rod being disposed pivotably secured to one end of a first flexible strap, a plate being disposed pivotably secured to one end of a second flexible strap, a portion of the marginal edge of the plate being disposed forming a hook, the plate having an opening adjacent the hook, a resilient spring-like member being disposed passing through the opening in the plate and having a hook-like end disposed adjacent to and parallel with the hook and located intermediate the hook and said one end of the second flexible strap, a sheet being disposed fixedly secured to the plate and spaced outwardly therefrom on a lateral surface of the plate, the sheet having a first portion thereof being disposed a fixed distance apart from said lateral surface of the plate, the sheet having a second portion thereof being disposed extending arcuately outwardly from said first portion of the sheet, the sheet having a third portion thereof angularly displaced towards said lateral surface and said opening, said third portion of the sheet being disposed adjacent said opening, said first portion of the sheet being disposed adjacent said one end of the second flexible strap, said second portion of the sheet being disposed intermediate said first and said third portions of the sheet, a bar, said bar being disposed intermediate said lateral surface of the plate and the adjacent lateral surface of the sheet, one end of the bar being wedge-shaped and being disposed intermediate the sheet and said one end of the second flexible strap, the other end of the bar being disposed in touching engagement with said third portion of the sheet and said first portion of the sheet.

2. The automatically disengagable safety buckle as claimed in claim 1, wherein the free ends of said C-shaped rod are disposed a wider distance apart, than the width of the bar.

* * * * *